United States Patent
Biemelt et al.

(10) Patent No.: US 10,874,891 B2
(45) Date of Patent: Dec. 29, 2020

(54) METHOD FOR PRODUCING HYDROPHOBIZED MIXED METAL OXIDE NANOPARTICLES AND USE THEREOF FOR HETEROGENEOUS CATALYSIS

(71) Applicant: Technische Universität Dresden, Dresden (DE)

(72) Inventors: Tim Biemelt, Tauer (DE); Julia Grothe, Dresden (DE); Stefan Kaskel, Dresden (DE); Karl Wegner, Dresden (DE)

(73) Assignee: TECHNISCHE UNIVERSITÄT DRESDEN, Dresden (DE)

( * ) Notice: Subject to any disclaimer, the term of this patent is extended or adjusted under 35 U.S.C. 154(b) by 0 days.

(21) Appl. No.: 15/737,299

(22) PCT Filed: Jul. 1, 2016

(86) PCT No.: PCT/EP2016/065570
§ 371 (c)(1),
(2) Date: Dec. 17, 2017

(87) PCT Pub. No.: WO2017/001679
PCT Pub. Date: Jan. 5, 2017

(65) Prior Publication Data
US 2018/0154200 A1    Jun. 7, 2018

(30) Foreign Application Priority Data

Jul. 2, 2015  (DE) .................... 10 2015 212 456

(51) Int. Cl.
*B01J 23/32* (2006.01)
*A62D 9/00* (2006.01)
(Continued)

(52) U.S. Cl.
CPC ............... *A62D 9/00* (2013.01); *A62D 3/38* (2013.01); *B01J 23/002* (2013.01);
(Continued)

(58) Field of Classification Search
CPC ......... A62D 9/00; A62D 3/38; B01J 35/1014; B01J 35/023; B01J 35/002; B01J 23/002;
(Continued)

(56) References Cited

FOREIGN PATENT DOCUMENTS

DE    10 2012 004 236 A1    9/2013
EP    1 760 043 A1    3/2007
(Continued)

OTHER PUBLICATIONS

Schulz et al. "Flame-made nanocrystalline ceria/zirconia doped with alumina or silica: structural properties and enhanced oxygen exchange capacity" J. Mater. Chem., 2003,13, 2979-2984 (Year: 2003).*

(Continued)

*Primary Examiner* — Haytham Soliman
(74) *Attorney, Agent, or Firm* — FisherBroyles, LLP; Andrew K. Gonsalves, Esq.

(57) ABSTRACT

The invention relates to methods for producing hydrophobized, doped or non-doped mixed metal oxide nanoparticles or doped metal oxide nanoparticles by flame spray pyrolysis, wherein a combustible precursor solution A, containing at least two metal alkyloates of general formula Me(OOC—R)$_x$ with differing metals Me, or a combustible precursor solution B containing at least one metal alkyloate of general formula Me(OOC—R)$_x$ and at least one metal salt containing a metal ion Me and at least one metal salt containing a metal ion Me, with Me selected from metal ions of the subgroups of the periodic system of the elements, with R=alkyl or aryl, wherein the alkyl chain is branched or straight, and wherein x corresponds to the oxidation step of (Continued)

the metal ion, is used in stoichiometric excess relative to a quantity of oxygen, and wherein a combustion ratio Φ of 3.5 bis 0.4 is established, and hydrophobized nanoparticles and the use thereof.

9 Claims, 7 Drawing Sheets

(51) Int. Cl.

| | | |
|---|---|---|
| B01J 37/08 | (2006.01) | |
| B01J 23/889 | (2006.01) | |
| B01J 35/00 | (2006.01) | |
| C01B 13/34 | (2006.01) | |
| C01G 1/02 | (2006.01) | |
| C01G 3/02 | (2006.01) | |
| B01J 37/34 | (2006.01) | |
| B01J 23/00 | (2006.01) | |
| B01J 35/02 | (2006.01) | |
| B01J 35/10 | (2006.01) | |
| C01G 45/02 | (2006.01) | |
| A62D 3/38 | (2007.01) | |
| B01J 31/04 | (2006.01) | |
| B82Y 30/00 | (2011.01) | |
| B82Y 40/00 | (2011.01) | |

(52) U.S. Cl.
CPC ......... *B01J 23/8892* (2013.01); *B01J 35/002* (2013.01); *B01J 35/0013* (2013.01); *B01J 35/023* (2013.01); *B01J 35/1014* (2013.01); *B01J 35/1019* (2013.01); *B01J 37/086* (2013.01); *B01J 37/088* (2013.01); *B01J 37/349* (2013.01); *C01B 13/34* (2013.01); *C01G 1/02* (2013.01); *C01G 3/02* (2013.01); *C01G 45/02* (2013.01); *B01J 31/04* (2013.01); *B82Y 30/00* (2013.01); *B82Y 40/00* (2013.01); *C01P 2002/72* (2013.01); *C01P 2004/64* (2013.01); *C01P 2006/12* (2013.01)

(58) Field of Classification Search
CPC .. B01J 37/349; B01J 35/1019; B01J 23/8892; B01J 37/088; B01J 37/086; B01J 35/0013; B01J 31/04; C01G 1/02; C01G 3/02; C01G 45/02; C01B 13/34; B82Y 40/00; B82Y 30/00; C01P 2002/72; C01P 2004/64; C01P 2006/12
USPC ........................................................ 502/324
See application file for complete search history.

(56) References Cited

FOREIGN PATENT DOCUMENTS

| | | |
|---|---|---|
| FR | 3 003 774 A1 | 10/2014 |
| WO | 2004/103556 A1 | 12/2004 |

OTHER PUBLICATIONS

Stark et al. "Gas phase synthesis of fcc-cobalt nanoparticles" J. Mater. Chem., 2006,16, 1825-1830 (Year: 2006).*

Grass et al. "Large-scale preparation of ceria/bismuth metal-matrix nano-composites with a hardness comparable to steel" J. Mater. Chem., 2007,17, 1485-1490 (Year: 2007).*

Teoh et al. "Flame spray pyrolysis: An enabling technology for nanoparticles design and fabrication." Nanoscale, 2010,2, 1324-1347 (Year: 2010).*

Rynkowsk et al. "Ceria-zirconia supported gold catalysts." Jest częścią : Annales Universitatis Mariae Curie-Sktodowska. Sectio AA, Chemia vol. 64, s. 197-217 (Year: 2009).*

Njagi et al. "Total oxidation of CO at ambient temperature using copper manganese oxide catalysts prepared by a redox method" Applied Catalysis B: Environmental vol. 99, Issues 1-2, Aug. 31, 2010, pp. 103-110 (Year: 2010).*

Podvyaznikov et al. "Technology of integrated usage of fullerene materials in sorbent production" Protection of Metals and Physical Chemistry of Surfaces Mar. 2009, vol. 45, Issue 2, pp. 197-202 https://doi.org/10.1134/S2070205109020129 (Year: 2009).*

European Patent Office (Acting as WIPO Searching Authority), International Search Report issued in International Application Counterpart Application No. PCT/EP2016/065570, dated Oct. 18, 2016.

Biemelt et al., "Microemulsion Flame Pyrolysis for Hopcalite Nanoparticle Synthesis: A New Concept for Catalyst Preparation," Chem. Commun., 51:5872-5875 (2015).

Biemelt et al., "Hopcalite Nanoparticle Catalysts with High Water Vapour Stability for Catalytic Oxidation of Carbon Monoxide," Applied Catalysis B: Environmental, 184:208-215 (2015).

Bai et al., "Comparison of the performance for oxidation of formaldehyde on nano-Co3O4, 2D-Co3O4, and 3D-Co3O4 catalysts," Applied Catalysis B: Environmental, 142-143:677-683 (2013).

Chen et al., "Hydrophobic Polymer-Coated Metal Oxide Catalysts for Effective Low-Temperature Oxidation of CO under Moisture-Rich Conditions," Chem. Mater., 22:3313-3315 (2010).

Chen et al., "Tunnel structure effect of manganese oxides in complete oxidation of formaldehyde," Microporous and Mesoporous Materials, 122:270-274 (2009).

Dittmar et al., "Microwave plasma assisted preparation of disperse chromium oxide supported catalysts Influence of the microwave plasma treatment on the properties of the supports," Catalysis Today, 89:169-176 (2004).

Grillo et al., "Low temperature oxidation of carbon monoxide: the influence of water and oxygen on the reactivity of a Co3O4 powder surface," Applied Catalysis B: Environmental, 48:267-274 (2004).

Jones et al., "Effects on Experimental Animals of Long-Term Inhalation Exposure to Carbon Monoxide," Toxicology and Applied Pharmacology, 19:46-53 (1971).

Kuo et al., "Facile Synthesis of Co3O4@CNT with High Catalytic Activity for CO Oxidation under Moisture-Rich Conditions," Acs Appl. Mater. Interfaces, 6:11311-11317 (2014).

Majedi et al., "Efficient hydrophobization and solvent microextraction for determination of trace nano-sized silver and titanium dioxide in natural waters," Analytica Chimica Acta, 789:47-57 (2013).

Sarkar et al., "Effect of amphiphile chain length on wet foam stability of porous ceramics," Ceramics International, 41:4021-4027 (2015).

Sturzenegger et al., "Controlling the formation of particle-stabilized water-in-oil emulsions," Soft Matter, 8:7471-7479 (2012).

* cited by examiner

METHOD FOR PRODUCING HYDROPHOBIZED MIXED METAL OXIDE NANOPARTICLES AND USE THEREOF FOR HETEROGENEOUS CATALYSIS

The present invention relates to a method for producing hydrophobized, doped or non-doped mixed metal oxide nanoparticles or doped metal oxide nanoparticles and hydrophobized, doped or non-doped mixed metal oxide nanoparticles or doped metal oxide nanoparticles as well as the use of the hydrophobized nanoparticles according to the invention as catalysts for the oxidation of carbon monoxide and/or formaldehyde under moist conditions and under normal conditions.

Carbon monoxide is an extremely toxic gas, which even at low concentrations of 100 ppm causes injury to the human body, and even death. [Jones, R. A., Strickland, J. A., Stunkard, J. A.& Siegel, J. Effects on experimental animals of long-term inhalation exposure to carbon monoxide. Toxicol. Appl. Pharmacol. 19, 46 (1971)].

Exposure to the colorless and odorless gas can occur in many situations. Fire-fighters, miners or soldiers in particular face particularly high risks of CO intoxication. Respirator masks are used to protect these groups of people from inhaling the gas. These are equipped with catalytically active materials that cause oxidation of CO with oxygen from air to less toxic $CO_2$.

The main catalytically active materials (supported on carriers) for this purpose are mixed oxides of manganese and copper (hopcalite), which may be doped by addition of calcium, cobalt, silver and/or additional transition metals. These are produced on a large industrial scale by precipitation reactions, followed by intensive washing and calcination.

A significant role is also ascribed to the catalytic oxidation of formaldehyde.

Formaldehyde is a widely used chemical with a penetrating odor, which is used in aqueous solution as a disinfectant and serves as a starting material for many additional chemical compounds. Since 2014 formaldehyde has been classified in the EU as a class 1B carcinogen and a class 2 mutagen.

Formaldehyde is mainly released indoors through incomplete combustion of, for example, cigarette smoke as well as outgassing processes from adhesives used in the production of wood-based materials such as plywood, built-in furnishings and decorative articles.

The principal catalytically active materials used for the oxidation of formaldehyde are (supported) transition metal oxides such as $Co_3O_4$ [B. Bai, H. Arandiyan, J. Li, Appl. Catal. B, 2013, 142-143, 677] or manganese oxides [T. Chen, H. Y. Dou, X. L. Li, X. F. Tang, J. H. Li, J. M. Hao, Microporous Mesoporous Mater., 2009, 122, 270.], but also supported noble metal catalysts such as Pt.

However, since inhaled air contains not only oxygen, which is important for the oxidation reaction, but always water as well, these highly hydrophilic materials are quickly inactivated because of the preferential adsorption of water molecules, resulting in poisoning of the catalyst. [Grillo, F. Low temperature oxidation of carbon monoxide: the influence of water and oxygen on the reactivity of a $Co_3O_4$ powder surface. Appl. Catal. B Environ. 48, 267 (2004)] Therefore up to now it has been essential either to fill the respirator filters with very large amounts of active material, resulting in enormous weights and volumes of the cartridges, inability to adapt to additional functions, and short shelf life, or it is necessary to resort to the use of expensive noble metal-containing catalysts, since these are stable against humidity for a longer time.

Up to now, increased water stability in the oxidation of CO to $CO_2$ under ambient conditions could only be achieved by applying hydrophobic molecules or polymers to the catalytically active surface of the nanoparticles [Chen, C.-H. et al. Hydrophobic Polymer-Coated Metal Oxide Catalysts for Effective Low-Temperature Oxidation of CO under Moisture-Rich Conditions. Chem. Mater. 22, 3313 (2010)] or by immobilizing active nanoparticle species on hydrophobic supports such as carbon nanotubes [Kuo, C.-H. et al. Facile Synthesis of $Co_3O_4$@CNT with High Catalytic Activity for CO Oxidation under Moisture-Rich Conditions. ACS Appl. Mater. Interfaces 6, 11311-11317 (2014)].

Various methods for rendering nanoparticles hydrophobic are known. these include, for example, liquid-phase hydrophobization [Sarkar, Naboneeta et al., Ceramics International, 41 (3), 4021, 2015; MAjedi, Seyed Mohammad et al. Analytica, Chimica Acta, 789 47, 2013; Sturzenegger, Philip et al. Soft Matter, 8 (28), 7471, 2012]. This method is disadvantageous especially for heterogeneous catalytically active materials, since in this process the active centers are inhibited and thus gas phase reaction is not possible.

Another possibility is that of hydrophobizing by splitting off OH— and $CO_2$— groups in an argon plasma. [Dittnar, A., Kosslick, H, Herein, D., Catalysis Today, 89 (1-2), 169, 2004] A disadvantage in this case is that this is a highly cost-intensive method, which is therefore not very suitable for large industrial application.

EP 1760043 A1 describes a method for producing metals, non-oxidized, ceramic and reduced metal oxides and nanopowders by flame spray pyrolysis.

For this purpose a precursor solution containing an organometallic compound, e.g., copper acetate in an organic solvent, e.g., ethylhexanoic acid is used.

This precursor solution is introduced in superstoichiometric quantity relative to the oxygen in the flame gas into the flame spray pyrolysis and converted to the metal or metal oxide at a lower oxidation level. The organic components of the precursor react to Co and H2.

Disclosed among other things are the production of metal powders with a protective layer of elements of the 2nd or 3rd periods of the periodic system of the elements, e.g., C. The precursor solution is used in stoichiometric excess in the presence of small quantities of oxygen, <1000 ppm, and results in incomplete combustion of the combustion gases, which once again results in a reducing atmosphere. This is primarily used for producing metals and "reduced metal oxides," which have a lower oxidation step than the most thermodynamically stable oxidation step.

The present invention is based on the task of specifying a method for producing hydrophobized and moisture-stable nanoparticles.

This task is accomplished using a method for producing hydrophobized, doped or non-doped mixed metal oxide nanoparticles or doped metal oxide nanoparticles by flame spray pyrolysis, wherein a combustible precursor solution A, containing at least two metal alkylates of general formula $Me(OOC—R)_x$ with differing metals Me or a combustible precursor solution B, containing at least one metal alkylate of general formula $Me(OOC—R)_x$ and at least one metal salt containing a metal ion Me and at least one salt ion with Me, preferably selected from metal ions of the subgroups of the periodic system of the elements (PSE), particularly from metal ions of the fourth, tenth and eleventh periods of the PSE, lanthanum and c cerium, particularly preferably manganese, cobalt, copper, palladium, platinum, silver and gold,
with R=alkyl or aryl with preferably a chain length of 1 to 25 carbon atoms, particularly preferably of 5 to 18 carbon atoms, wherein the alkyl chain is branched or unbranched and/or may have an arbitrary number of unsaturated carbon atoms, even more preferably 2-ethylhexyl, oleate and stearate,
wherein x corresponds to the oxidation state of the metal ion, wherein in precursor solution B, Me (metal alkylate)≠Me (metal salt),
is used in stoichiometric excess based on a quantity of oxygen, and wherein a combustion ratio of Φ from 3.5 bis 0.4 is established.

Nanoparticle in the sense of the invention designates a combination of several atoms and/or molecules that has a size in the nano range, preferably from 0.1 to 100 nm, particularly preferably from 1 to 45 nm, most particularly preferably from 1 to 35 nm. Preferably, nanoparticles with a homogeneous, monodisperse size distribution in the indicated size range are produced.

Hydrophobized nanoparticles according to the invention means nanoparticles that are hydrophobic, thus have water-repelling properties. Hydrophobization can be achieved, for example, by coating and/or introducing a hydrophobic component onto or into the nanoparticles.

Flame spray pyrolysis (FSP), also known as spray pyrolysis or Flammsprühpyrolyse, is the name given to a method in which a precursor solution is burned in a combustion flame with a gaseous reactant and converted to hydrophobized nanoparticles. A mixture of oxygen and methane is preferably used in flame spray pyrolysis to generate the pilot flame. The ratio of oxygen to methane in the mixture is preferably 2.5:1 to 1:2.

The methane is preferably introduced with a process flow of 0.5 to 7.5 l/min, particularly preferably from 1 to 4.5 l/min, most particularly preferably with 1.2 to 1.7 l/min and oxygen preferably with 2 to 7 l/min, particularly preferably with 2.5 to 4 l/min, most particularly preferably with 2.5 to 3.5 l/min.

In the flame spray process, a dispersion gas is required; this serves for dispersing a precursor solution. This atomizes the solution into fine droplets, which are then burned or evaporated. Oxygen is preferably used as the dispersion gas.

The oxygen is preferably present at a pressure of 1.5 to 3 bar, particularly at 1.5 to 2.5 bar. The process flow of the oxygen is set at 1 to 10 l/min, particularly preferably 2 to 6 l/min, most particularly preferably at 3 to 5 l/min.

A quantity of oxygen in the sense of the invention designates the total quantity of oxygen used in the method according to the invention. In this process, on one hand, oxygen is used as the dispersion gas, and also as a mixture of oxygen with methane. The total quantity of oxygen is calculated according to the invention from the quantity of oxygen used as dispersion gas plus the quantity of oxygen from the oxygen-methane mixture.

Preferably each precursor solution contains at least one organic solvent selected from n-hexane, ethanol, 2-ethylhexanoic acid, methanol, acetic acid, n-heptane, xylene, toluene, benzene, trichloromethane, ethylbenzene and mixtures of these, particularly preferably a mixture of methanol and acetic acid.

Preferably a precursor solution with a concentration from 0.01 to 0.5 M, particularly preferably from 0.01 to 0.1 M, most particularly preferably from 0.03 to 0.07 M is used, based on the total content of metal ions in the precursor solution.

According to the invention, the precursor solution A contains at least two metal alkylates of the general formula $Me(OOC-R)_x$ In one embodiment the precursor solution A contains two metal alkylates with a molar ratio of 10:90 to 90:10, preferably 20:80 to 80:20, particularly preferably 25:75 to 75:25.

According to the invention, the precursor solution B contains at least one metal alkylate of general formula $Me(OOC-R)_x$ and at least one metal salt containing a metal ion Me and at least one salt ion.

In one embodiment, the metal salts are organometallic salts containing a metal cation $Me^{x+}$. In one embodiment the organic salt anions of the organic metal salts are selected from acetate, gluconate, 2-ethylhexanoate, stearate, benzoate, acetylacetonate or mixtures thereof.

In one embodiment the metal salts are inorganic metal salts containing a metal cation Me and at least one inorganic salt anion. In another embodiment the inorganic salt anions of the inorganic metal salts are selected from nitrate, sulfate, chloride, bromide, iodide or mixtures thereof.

In one embodiment the at least one metal salt in the precursor solution B contains at least one organic and/or at least one inorganic salt anion.

In one embodiment, in precursor solution B the molar ratio of the total quantity of the metal alkyloates to the total quantity of metal salts is 80:20 to 99:1.

In one embodiment of the invention, the alkylate residues of the metal alkylates are selected from 2-ethylhexanoate, stearate, oleate, acetylacetonate, dodecanoate and/or palmitate, wherein in a precursor solution metal alkylates with the same metal may have the same or different alkylate residues.

In an additional embodiment of the invention, the precursor solution A contains at least one manganese alkylate and at least one copper alkylate, particularly preferably manganesebis(2-ethylhexanoate) and copperbis(2-ethylhexanoate), dissolved in a mixture of methanol and acetic acid (9:1 V/V) with a total metal ion concentration of 0.02 to 0.7 M.

In an additional embodiment of the invention, the precursor solution A contains a two-metal alkylate mixture, the composition of which is selected from copper alkylate/manganese alkylate, copper alkyloate/zinc alkylate or cerium alkylate/manganese alkylate.

In an additional embodiment of the invention, the precursor solution A contains a three-metal alkylate mixture, the composition of which is preferably selected from copper alkylate/manganese alkylate/cerium alkylate.

In an additional embodiment of the invention, the precursor solution B contains a two-metal alkylate/a metal salt mixture, the composition of which is preferably selected from copper alkylate/manganese alkylate/organic or inorganic metal salt, preferably copper alkylate/manganese alkylate/tetrachloroauric acid, copper alkylate/manganese alkylate/Co-2-ethylhexanoate, copper alkylate/manganese alkylate/Sn-2-ethylhexanoate or copper alkylate/manganese aklylate/Ag-2-ethylhexanoate.

In an additional embodiment of the invention, the precursor solution B contains a single-metal alkylate/single-metal salt mixture, the composition of which is preferably selected from titanium alkylate/Pd precursor, cerium alkylate/Pd precursor, titanium alkylate/Pt precursor, titanium alkylate/Au precursor, cerium alkylate/Au precursor, aluminum alkylate/Au precursor.

In an additional embodiment of the invention, the precursor solution B contains a two-metal alkylate/four-metal salt mixture, the composition of which is selected from copper alkylate/manganese alkylate/Ag, Co, Au, Sn salt.

In one embodiment of the invention, the precursor solution is used in a stoichiometric excess, particularly preferably with a 1.5- to 4-fold excess, most particularly preferably with a 1.5 to 2.5-fold excess, based on the oxygen in the dispersion gas, in the flame spray pyrolysis. When the precursor solution is carried into the flame, evaporation and ignition of the solvent occur, simultaneously with combustion of the organic constituents $(OOC-R)_x$ and the precursors. Depending on the precursor solution used, doped or non-doped metal oxide nanoparticles or doped mixed metal oxide nanoparticles are formed from the metal ions.

In one embodiment of the invention, in which a precursor solution A, containing manganesebis(2-ethylhexanoate) and copperbis(2-ethylhexanoate), hopcalite nanoparticles are formed. Hopcalite is a mixed crystal consisting of manganese- and copper oxides. Additional metal oxides, such as cobalt oxide and silver(I)-oxide, may be present. For this purpose the corresponding precursors, containing these metals, would have to be used. Advantageously, because of the stoichiometric excess of the precursor solution, incomplete combustion of the organic constituents $(OOC-R)_x$ and the precursor takes place.

The person skilled in the art understands complete combustion as comprising the oxidation of combustible substance to water and carbon dioxide with consumption of oxygen. In incomplete combustion, in addition to water and carbon dioxide, other compounds are also formed, which have not bound the maximum necessary quantity of oxygen, for example carbon monoxide and carbon.

According to the invention, in the incomplete combustion of the precursors, the solvent and/or the methane, among other things carbon is formed; this deposits on and/or in the nanoparticles formed and renders the nanoparticles hydrophobic. The spray parameters (dispersion flow, methane-oxygen ratio, combustion ratio) and the composition of the precursor solution can be varied such that the nanoparticles exhibit a variable carbon content, preferably of up to 2 wt.-%, particularly preferably of up to 1.5 wt.-%, and most particularly preferably of up to 1 wt.-%.

According to the invention, hydrophobic, non-doped mixed metal oxide nanoparticles on or in which carbon is deposited forms from precursor solution A.

According to the invention, hydrophobic, doped metal oxide or mixed metal oxide nanoparticles on or in which carbon is deposited forms from precursor solution B.

Advantageously, hydrophobic nanoparticles with a homogeneous size distribution with improved moisture stability are produced in oxidation reactions using oxygen-containing ambient air with up to 75% relative humidity at air temperature.

In one embodiment of the invention, hopcalite nanoparticles on or in which carbon is deposited form.

A combustion ratio $\Phi$ of 3.5 to 0.4, particularly preferably of 1.5 to 0.7, is established by selecting the stoichiometric excess. $\Phi$ is calculated according to equation 1 and describes the ratio of the true molar oxygen-solvent (LM) ratio to the stoichiometric molar oxygen-solvent (LM) ratio.

$$\Phi = \frac{(\text{mol } O_2/\text{mol } LM)_{real}}{(\text{mol } O_2/\text{mol } LM)_{stoich.}} \quad \text{(Equation 1)}$$

The solvent (LM) in this case refers to the solvent or solvent mixture in which the precursor is dissolved. The smaller the factor $\Phi$ is, the less complete is the combustion of the organic components R of the precursors and the solvent taking place in the flame. A value of 1 represents a theoretical 100% combustion, whereas for example a value of 0.4 means a 40% combustion.

Advantageously, incomplete combustion always takes place with the method according to the invention. Even in the case of a combustion ratio greater than 1, incomplete combustion is achieved by the selection of precursors. In addition, it should be noted that all the oxygen used is necessarily completely consumed for the oxidation, but part of the oxygen always leaves the flame without being used. According to the invention, the parameters of oxygen quantity, combustion ratio and type and quantity of precursors are selected such that incomplete combustion takes place.

In one embodiment of the invention, the precursor solution is a solution containing at least an oleate, a 2-ethylhexanoate, a stearate, an acetylacetoate, a dodecanoate, a palmitate and/or mixtures thereof, of a metal ion (Me), dissolved in a solvent selected from n-hexane, ethanol, 2-ethylhexanoic acid, methanol, acetic acid, n-heptane, trichloromethane, xylene and mixtures thereof.

In one embodiment the mixtures of the solvents are selected from ethanol-2-hexanoic acid mixtures, ethanol-methanol mixtures, xylene/2-ethylhexanoic acid/methanol and methanol-acetic acid mixtures. For this purpose, the two solvents can be mixed together in any volume ratio.

In one embodiment of the invention, the solvent is burned in the flame. The combustion enthalpy of the solvent used can enable an advantageous effect the on the particle properties such as crystallinity, particle size and composition. In a particular embodiment of the invention, the solvent undergoes incomplete combustion so that among other things carbon is formed; this deposits on and/or in the nanoparticles formed.

In one embodiment of the invention, the precursor solution is introduced into the pilot flame with a flow rate of 0.5 to 50 ml/min, particularly preferably from 1 to 30 ml/min, most particularly preferably with 1 to 11 ml/min. Any pump known to the person skilled in the art can be used to deliver the precursor solution. Advantageously the flow rate can be used to set how much precursor solution is introduced into the pilot flame, and thus how much precursor is sent for combustion.

In one embodiment of the invention, a quartz tube is placed over the combustion flame. Advantageously in this way additional oxygen from the ambient air is prevented from reaching the combustion flame, participating in the oxidation, and causing unwanted complete combustion of the precursors.

In one embodiment of the invention, the length of the quartz tube is at least as great as that of the combustion flame, so that the latter lies completely within the quartz tube. The quartz tube preferably has a length of 100 to 600 mm, particularly preferably 200 to 450 mm.

In one embodiment of the invention, the quartz tube has an external diameter of 30 to 60 mm, particularly preferably of 40 to 50 mm.

In one embodiment of the invention, the wall thickness of the quartz tube is 1.5 to 5 mm, preferably 1.5 to 4 mm, particularly preferably 1.5 to 3 mm.

The method is a rapid, continuous, scaleable at will, environmentally compatible for the synthesis of catalytically active and combination-free nanoparticles. Advantageously the production of the nanoparticles takes place in only one step. The use of large quantities of large quantities of precipitating agents and wash water can be avoided, providing an economical method.

The invention also relates to hydrophobized nanoparticles, containing carbon at a content of 0.1 to 5 wt.-%, particularly preferably 0.5 to 3 wt.-%, most particularly preferably with 0.5 to 1.5 wt.-%, based on the total quantity of nanoparticles and a hydrophobicity index (HI) of 0.2 to 1, particularly preferably of 0.3 to 0.8, most particularly preferably of 0.4 to 0.7.

Hydrophobicity index (HI) in the sense of the invention designates the ratio of the specific pore volume of the nanoparticles at $p/p_0=0.75$ (corresponds to 75% humidity at 20° C.) filled with water ($V_{pore;0.75}(H_2O)$) to the pore volume filled within nitrogen ($V_{pore;0.75}(N_2)$) according to Equation 2:

$$HI(75) = \frac{V_{pore;0.75}(H_2O)}{V_{pore;0.75}(N_2)} \qquad \text{(Equation 2)}$$

An HI value of 1 stands for a highly hydrophilic character of the nanoparticle, whereas an HI value of less than 1 stands for hydrophobic particles.

The specific pore volume for water in this process is taken from H2O physisorption isotherms at 25 C, and that for nitrogen from N2 physisorption isotherms at 77K.

The hydrophobized nanoparticles contain carbon, preferably as a coating. However, the carbon may also be located in the interior of the nanoparticle.

In one embodiment of the invention, the nanoparticles have a specific surface of 10 to 250 m²/g, particularly preferably of 30 to 160 m²/g, most particularly preferably of 30 to 100 m²/g.

The specific internal surface arises from the nitrogen physisorption measurement and the BET method. These characterization methods are known to the person skilled in the art. Advantageously the nanoparticles exhibit a type II isotherm in the physisorption measurement.

The invention also relates to the use of the hydrophobized nanoparticles for the oxidation of carbon monoxide and/or formaldehyde.

Advantageously, oxidation of carbon monoxide and/or formaldehyde with the catalytic action of the hydrophobized mixed and/or doped metal oxide nanoparticles under moist conditions is also possible. For example, the hydrophobized nanoparticles may be used in respiratory masks. For use in respiratory masks, using the hydrophobized nanoparticles can save catalyst volume and mass, which allows the design of the cartridges for eliminating additional toxins from the inhaled air.

For example, the hydrophobized nanoparticles according to the invention can also be used in cigarette filters.

Use in other oxidation reactions, for example the oxidation of volatile organic substances, is also possible.

The features of the invention disclosed in the description, the embodiments and the claims can be important both individually and in any combination whatsoever for realizing the invention in its various embodiments.

Additional features and benefits of the invention will be explained in further detail based on the following exemplified embodiments, without limiting the invention to these.

EXEMPLIFIED EMBODIMENTS

Based on the figures and embodiments presented, the invention will be described in detail, without being limited to these. These show the following.

EXAMPLE 1—FLAME SPRAY PYROLYSIS OF OLEATE PRECURSORS WITHOUT QUARTZ TUBE

1a) Synthesis of the Precursor Solution, Manganese Oleate-Copper Oleate Precursor Solution Mixed Mn(II)/Cu(II) precursors are synthesized starting from sodium oleate and metal chlorides. For this, sufficient CuCl2.2H2O (Alfa Aesar 99%) and MnCl2.2H2O (Grüssing 99%) are dissolved in a mixture of ethanol and water (1:1; V/V) so that the metal ions are present in a total concentration of 0.6 M. Then a suspension of 0.6 M sodium oleate (Sigma Aldrich≥82%), dissolved in n-hexane (Merck analytical grade) is added and refluxed for 4 h at 70° C. Then the organic phase is washed twice with half its volume of deionized water. Finally the separated organic phase is diluted with enough n-hexane so that a clear, brown to green 0.05 M solution, based on the total concentration of the metal ions, is formed.

1b) Flame Spray Pyrolysis

The solution is conveyed at 3.0 mL min⁻¹ to a two-substance nozzle (FIG. 10) and atomized to form an aerosol with a dispersion gas flow of 4.89 slm. This is ignited with the aid of a methane flame, through 1.50 slm CH₄ and 3.00 slm O₂. The dispersion gas pressure drop at the outlet of the nozzle is 2.0 bar. The black particles were collected using a 15 cm diameter glass fiber filter by applying a negative pressure.

1c) Characterization of the Hopcalite Nanoparticles

Figure 1:
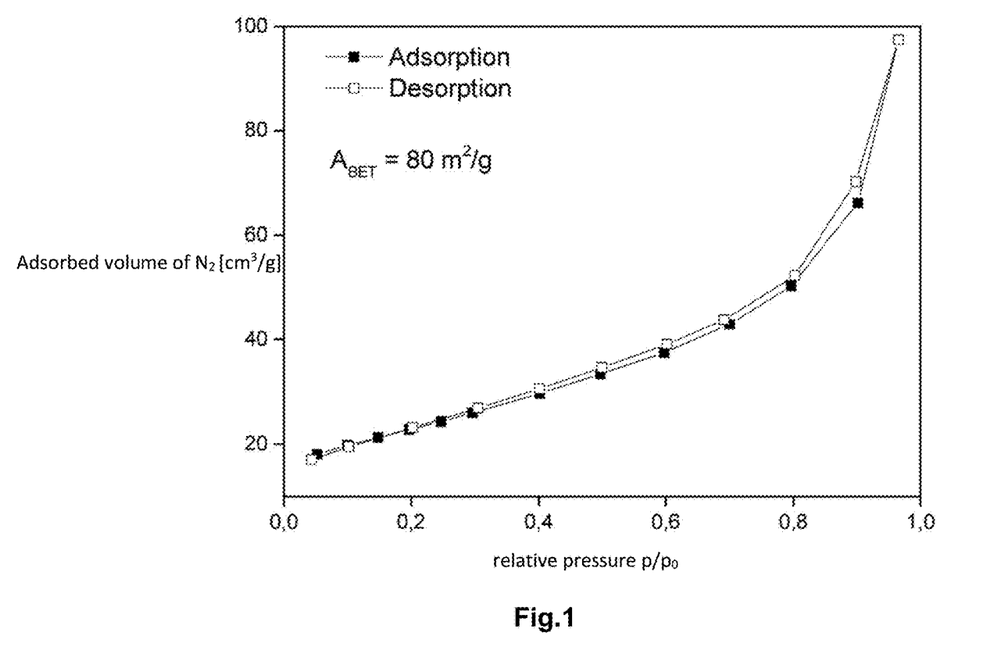
FIG. 1 Nitrogen physisorption isotherms at 77 K of the hopcalite nanoparticles produced from an oleate precursor with $n_{Cu}/n_{Mn}=1:2$ according to example 1b, FIG. 2 X-ray diffractogram (PXRD measurement) of the hopcalite nanoparticles produced from an oleate precursor with $n_{Cu}/n_{Mn}=1:2$ according to example 1b, FIG. 3 SEM image of the hopcalite nanoparticles produced from an oleate precursor with $n_{Cu}/n_{Mn}=1:2$ according to example 1b, FIG. 4 Conversion-temperature diagram for the hopcalite nanoparticles produced according to example 2b compared with commercially available Carulite 300, FIG. 5 Catalytic activity for the hopcalite nanoparticles produced according to example 2b compared with commercially available Carulite 300, FIG. 6 X-ray diffractogram (PXRD measurement) of the hopcalite nanoparticles produced from an ethylhexanoate precursor with $n_{Cu}/n_{Mn}=1:2$ according to example 3b, FIG. 7 Nitrogen physisorption isotherms at 77 K of the hopcalite nanoparticles produced according to example 3b, FIG. 8 H₂O physisorption isotherms at 25° C. of the hopcalite nanoparticles produced according to example 3b compared with Carulite 300, FIG. 9 x-time diagram for the long-term activity of the hopcalite nanoparticles produced according to example 3b in CO oxidation compared with activated Carulite 300 at room temperature under dry conditions FIG. 10 Structure of the flame generation unit in a flame spray pyrolysis unit, FIG. 11 Structure of the flame generation unit in a flame spray pyrolysis unit with quartz tube.
Figure 2:
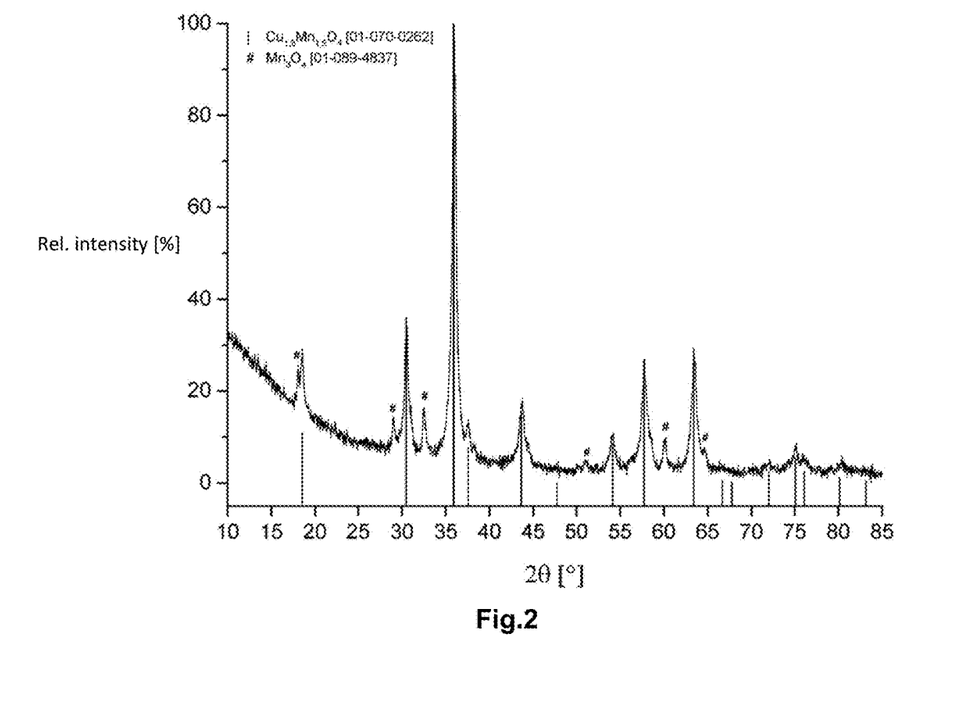
Figure 3:
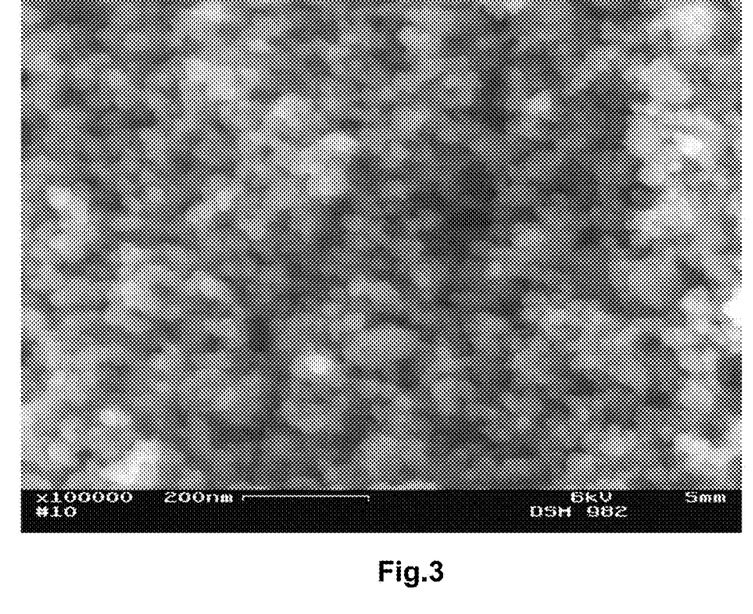

The hopcalite nanoparticles produced according to example 1b are characterized by nitrogen physisorption measurement (FIG. 1), PXRD measurement (FIG. 2), scanning electron imaging (SEM imaging, FIG. 3, and elemental analysis.

The nitrogen physisorption measurement of the hopcalite nanoparticles produced from an oleate precursor with $n_{Cu}/n_{Mn}$=1:2 (FIG. 1) shows the typical isotherm form of non-porous particles (type II isotherms) The particle size can be calculated from the specific surface at 13.8 nm.

The X-ray diffractogram (FIG. 2) shows that nanocrystalline $Cu_{1.5}Mn_{1.5}O_4$ has formed. In addition to $Cu_{1.5}Mn_{1.5}O_4$, $Mn_3O_4$ is already present as a minor phase.

The SEM imaging, FIG. 3) shows that homogeneously distributed hopcalite nanoparticles with a uniform size distribution formed according to example 1b. The particles have a diameter of about 14 nm.

Elemental analysis of Mn:Cu-2:1 from oleate precursor:

| Element | Measurement 1 | Measurement 2 | Mean |
|---|---|---|---|
| C | 0.1 | 0.085 | 0.0925 |
| N | 0.363 | 0.366 | 0.3645 |

EXAMPLE 2—FLAME SPRAY PYROLYSIS OF ETHYLHEXANOATE PRECURSORS

2a) Synthesis of the Precursor—manganesebis(2-ethylhexanoate)-copperbis(2-ethylhexanoate) Precursor Solution As the precursor, the 2-ethylhexanoates of copper and manganese are used and dissolved in a mixture of 90 vol.-% methanol and 10 vol.-% acetic acid, so that a total metal ion concentration of 0.05 mol/l results. The molar ratio of copper to manganese is 1:2.4.

2b) Flame Spray Pyrolysis

The solution was conveyed at 2.5 mL min$^{-1}$ to a two-substance nozzle (FIG. 10) and atomized to form an aerosol with a dispersion gas flow of 7.5 slm. This was ignited with the aid of a methane flame, fed through 1.50 slm $CH_4$ and 3.00 slm $O_2$. The dispersion gas pressure drop at the outlet of the nozzle was 2.0 bar. The black particles were collected using a 15 cm diameter glass fiber filter by applying a negative pressure.

2c) Characterization of the Hopcalite Nanoparticles

The nitrogen physisorption measurement gives a specific surface of 160 m$^2$/g, from which a particle size of approx. 7 nm can be derived. The carbon content is determined as 0.31 wt.-% in a triplicate measurement (elemental analysis). Using ICP-OES (optical emission spectrometry with inductively coupled plasma) a manganese to copper molar ratio of 1.95 is determined.

2d) CO Oxidation

The CO oxidation takes place in a 6 mm wide and 40 cm long integral glass tube, 30 cm of which are surrounded by the heating zone of an oven. With the aid of this oven, the reaction temperatures of 25 to 200° C. are set and tested in the catalyst bed using a temperature sensor. Before use in catalysis, the synthesized samples are washed twice with distilled water and centrifuged.

For measuring the powdered catalysts, a layer of quartz glass wool is placed on the raised floor in the glass tube, then 100 mg of the washed catalyst (approx. 0.5 cm filling depth) is placed on top of this. The gas stream is passed through the catalyst bed from the top.

The reaction gas used was a mixture of 0.67 Vol % CO in 66.00 Vol % $N_2$ and 33.33 Vol % $O_2$. The WHSV (weight hourly space velocity) is 35760 mL h$^{-1}$ g$_{Kat}$$^{-1}$. The resulting $CO_2$ is detected online using a smartMODUL$^{PREMIUM}$ NDIR sensor from Pewatron. The model number is P1-212506 (0-5 Vol.-%). Using a precisely 100 Ω resistance, the current signal (0-20 mA) emitted by the detector is converted to a voltage signal (0-2V) and recorded as a time-dependent digital signal using a Meilhaus RedLab 1208LS. The signal rate is 1 Hz and the sensor resolution, 10 mV.

To remove residual gases from the system, each catalyst is purged with nitrogen at 3 L h$^{-1}$ for at least 10 min before beginning the series of measurements. The CO conversion is measured at room temperature and oven temperatures of 80, 110, 150 and 200° C. After a sample is measured at the highest temperature, it is activated at 300° C. for 1 h in a 1 L h$^{-1}$ oxygen stream without carbon monoxide being present, then cooled to room temperature and again investigated at the various oven temperatures to test the effect of activation on the catalytic activity. The measurement variable used is the mean of the signal of the last 5 respective minutes of measurement (300 measured values). The conversions are calculated by comparison with a previously recorded calibration curve.

Figure 4:
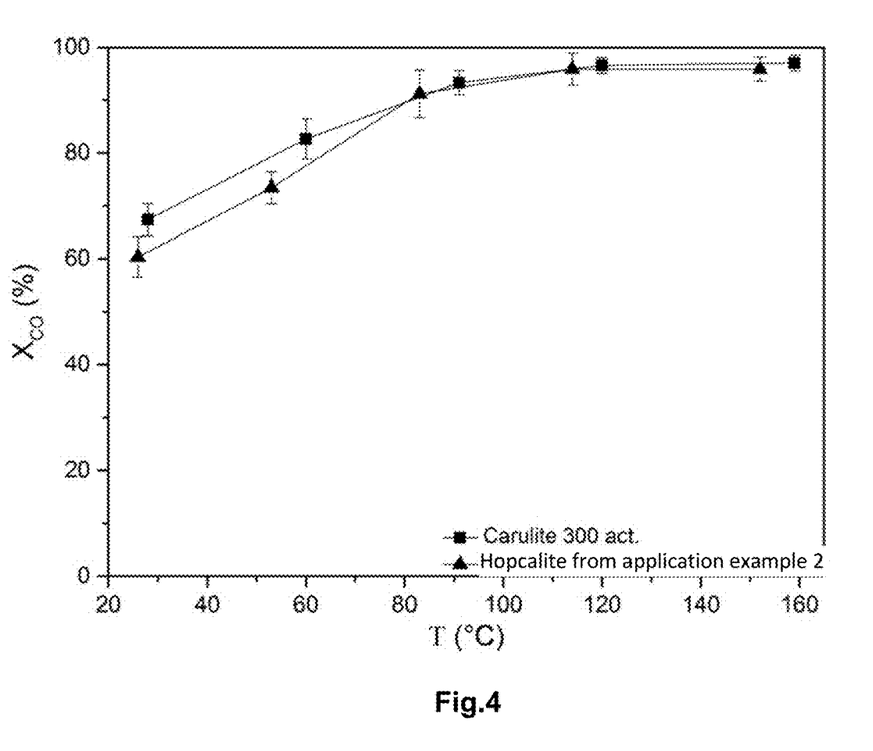
Figure 5:
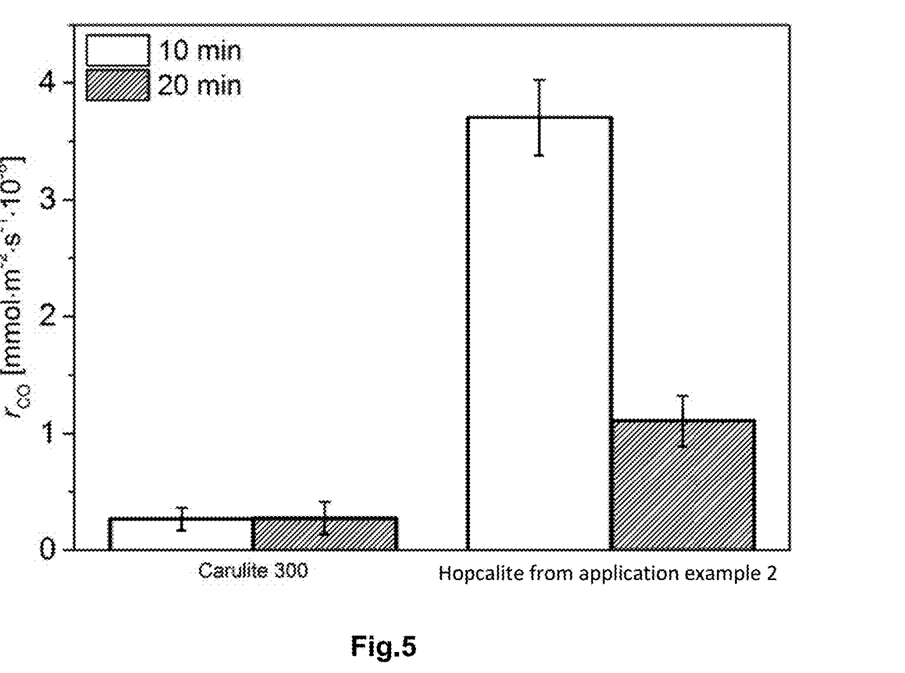

FIG. 4 shows the conversion as a function of the temperature for the hopcalite catalyst produced according to example 2b compared with commercially available Carulite 300. For measuring the catalytic activity under moist conditions, the reaction gas mixture was passed through a water bath, which was maintained at 15° C. using a thermostat. A moisture content of 75% is obtained for the gas at this temperature. The gas mixture enriched with water in this way was then passed over the catalyst. The activity was measured at room temperature for 20 min. FIG. 5 shows the catalytic activity for the hopcalite catalyst produced according to example 2b compared with commercially available Carulite 300 under humid conditions after 10 and 20 min. Advantageously, the catalyst according to the invention shows that it was possible to distinctly improve the stability against moisture. The conversion after 10 and 20 minutes in humid air is distinctly increased compared with the commercial product.

EXAMPLE 3—FLAME SPRAY PYROLYSIS OF ETHYLHEXANOATE PRECURSORS WITH A QUARTZ TUBE

3a) Precursor Synthesis

As the precursor, the 2-ethylhexanoates of copper and manganese are used and dissolved in a mixture of 90 vol.-% methanol and 10 vol.-% acetic acid, so that a total metal ion concentration of 0.05 mol/l results. The molar ratio of copper to manganese is 1:2.

3b) Flame Spray Pyrolysis

Figure 11:
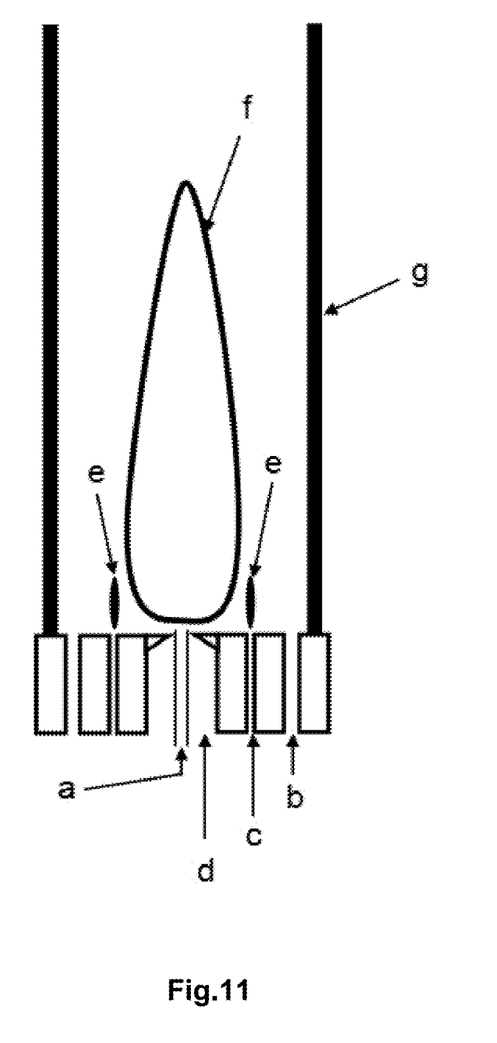

A quartz glass tube 400 mm in length and with an external diameter of 45 mm (wall thickness 2-2.5 mm) is additionally placed on the two-substance nozzle used in 1b), enclosing the flame, as shown in FIG. 11. The ignition of the aerosol atomized by a dispersion gas flow of 4.12 slm $O_2$ (φ=1.0; see Equation 1) is performed with a pilot flame fed with methane (1.5 slm) and oxygen (3 slm).

Using a micro annular gear pump, the precursor from example 3a is fed to the outlet of the capillary at 5 ml/min, without pulsations, at a dispersion gas pressure drop of 2 bar. The black particles were collected using a 15 cm diameter glass fiber filter by applying a negative pressure.

3c) Characterization of the Hopcalite Nanoparticles

Figure 6:
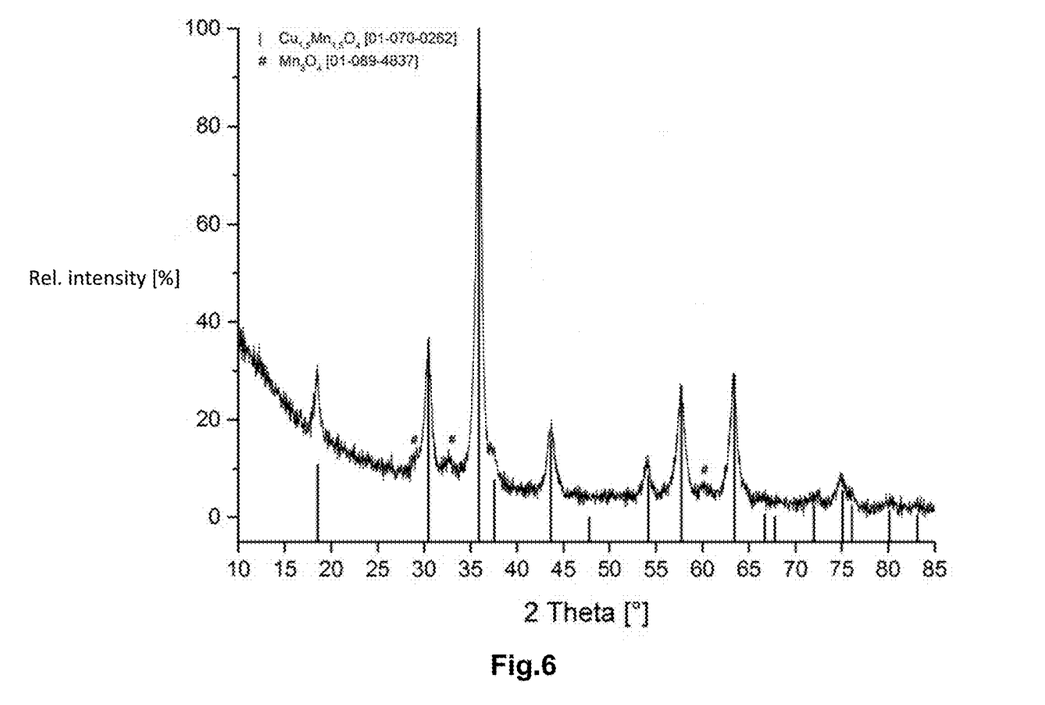
Figure 7:
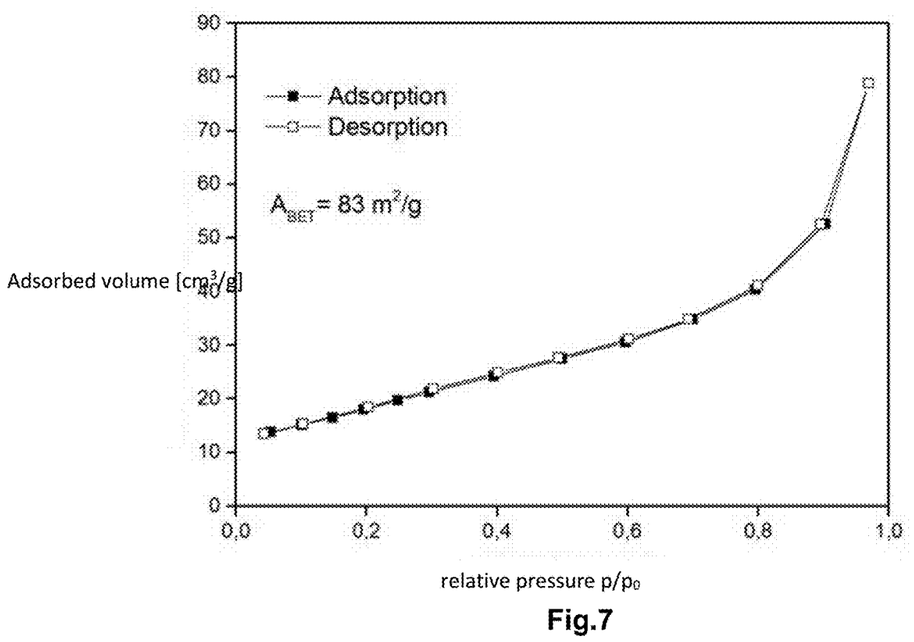

The hopcalite nanoparticles produced according to example 3b are characterized by X-ray powder diffractometry (FIG. 6), nitrogen physisorption (FIG. 7), water physisorption (FIG. 8) and elemental analysis. The nitrogen physisorption measurement gives a specific surface of 83 $m^2/g$, from which a particle size of approx. 13 nm can be derived. The carbon content is determined as 0.75 wt.-% in a triplicate measurement (elemental analysis).

Table 1 shows the elemental analysis of the nanoparticles according to example 3c.

TABLE 1

| | |
|---|---|
| C | 0.76 |
| N | 0.03 |
| H | 0.268 |
| S | 0.02 |

The X-ray powder diffractogram (FIG. 6) shows the X-ray diffractogram (PXRD measurement) of the hopcalite nanoparticles produced according to example 3b with $n_{Cu}/n_{Mn}$=1:2. In addition to $Cu_{1.5}Mn_{1.5}O_4$, $Mn_3O_4$ is already present as a minor phase.

Figure 8:
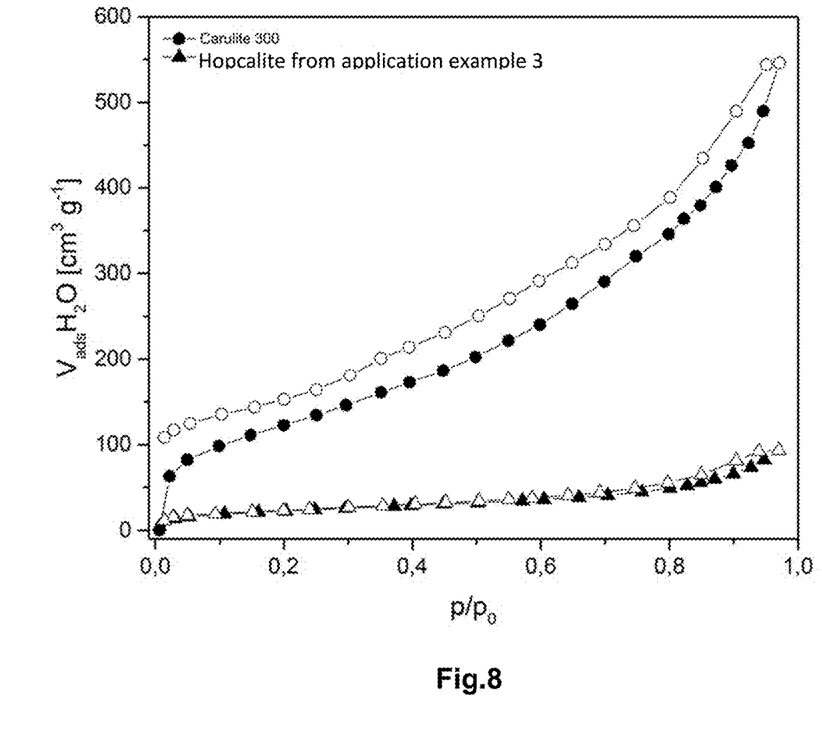
Figure 9:
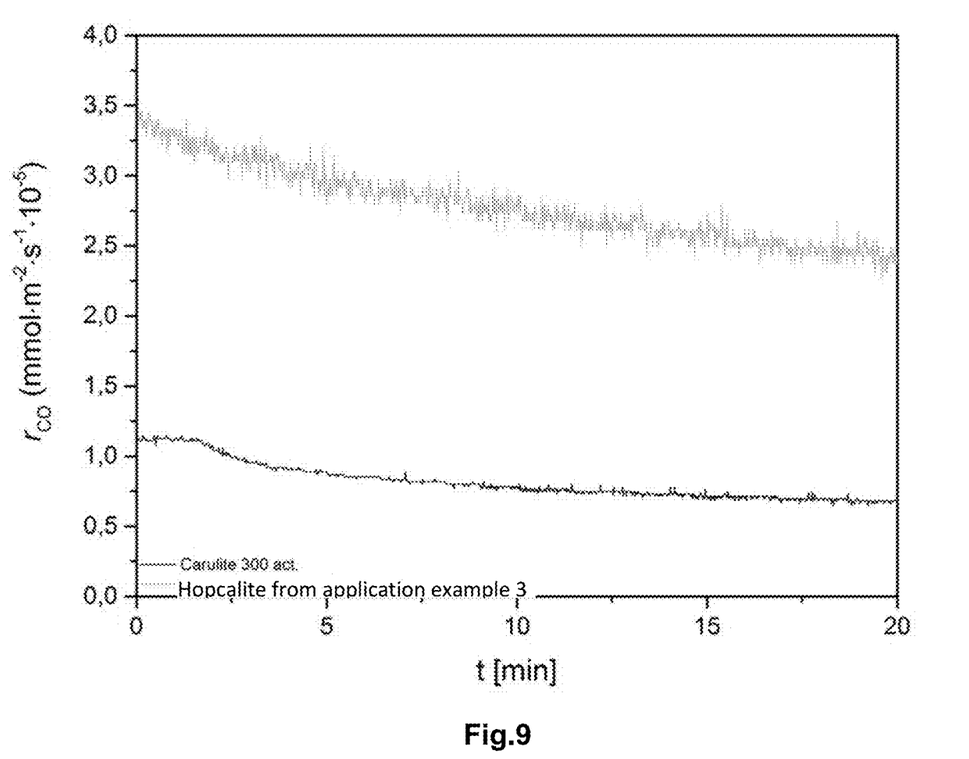

FIG. 8 shows the $H_2O$ physisorption isotherms at 25° C. of the hopcalite nanoparticles produced according to example 3b compared with Carulite 300. The hydrophobicity of the samples can be recognized from the slope of the curves at low p/p0 values. Hydrophilic samples such as Carulite 300 already exhibit a steep slope at low pressures, and associated with this, a high water uptake capacity. The hopcalite particles produced according to the invention exhibit only a very slight slope at low pressures, indicating a low uptake capacity of the hydrophobic particles for water 3d) CO Oxidation The CO oxidation takes place in a 6 mm wide and 40 cm long integral glass tube, 30 cm of which are surrounded by the heating zone of an oven. With the aid of this oven, the reaction temperatures of 25 to 200° C. are set and tested in the catalyst bed using a temperature sensor. Before use in catalysis, the synthesized samples are washed twice with distilled water and centrifuged.

For measuring the powdered catalysts, a layer of quartz glass wool is placed on the raised floor in the glass tube, then 100 mg of the washed catalyst (approx. 0.3 cm filling depth) is placed on top of this. The gas stream is passed through the catalyst bed from the top.

The reaction gas used is a mixture of 0.67 Vol % CO in 66.00 Vol % $N_2$ and 33.33 Vol % $O_2$. The WHSV is 42000 mL $h^{-1}$ $g_{Kat}^{-1}$. The resulting $CO_2$ is detected online using a smartMODUL$^{PREMIUM}$ NDIR sensor from Pewatron. The model number is P1-212506 (0-5 Vol.-%). Using a precisely 100 Ω resistance, the current signal (0-20 mA) emitted by the detector is converted to a voltage signal (0-2V) and recorded as a time-dependent digital signal using a Meilhaus RedLab 1208LS. The signal rate is 1 Hz and the sensor resolution, 10 mV.

To remove residual gases from the system, each catalyst is purged with nitrogen at 3 L $h^{-1}$ for at least 10 min before beginning the series of measurements. The conversion of CO is measured at room temperature and oven temperatures of 80, 110, 150 and 200° C. After a sample is measured at the highest temperature, it is activated at 300° C. for 1 h in a 1 L $h^{-1}$ oxygen stream without carbon monoxide being present, then cooled to room temperature and again investigated at the various oven temperatures to test the effect of activation on the catalytic activity. The measurement variable used is the mean of the signal of the last 5 respective minutes of measurement (300 measured values). The conversions are calculated by comparison with a previously recorded calibration curve.

Figure 10:
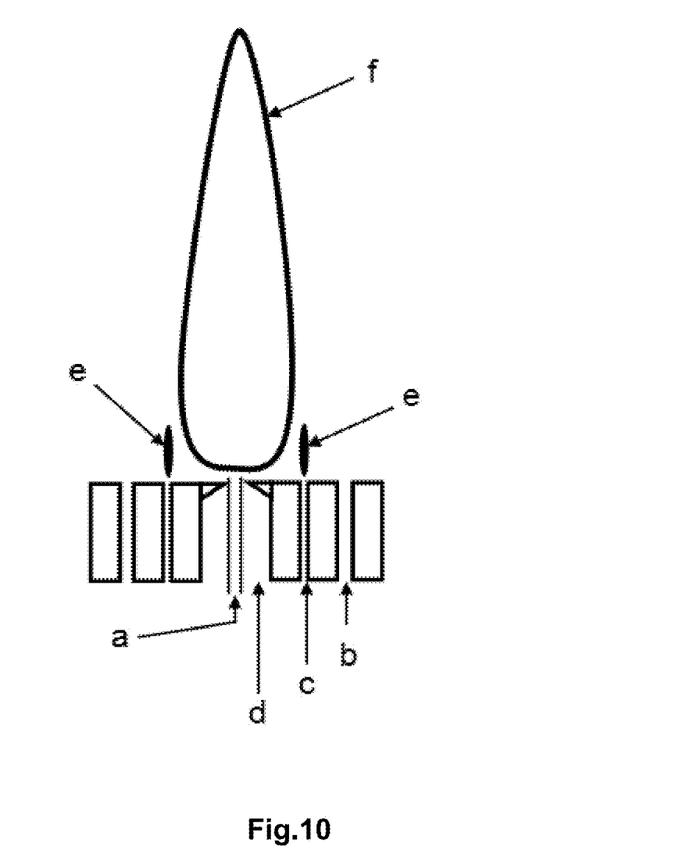

SYMBOLS a) Precursor solution
b) Shielding gas
c) Ignition gas
d) Dispersion gas.
e) Pilot flame
f) Combustion flame
g) Quartz tube

The invention claimed is:

1. A method for producing hydrophobized, hopcalite nanoparticles on or in which carbon is deposited, with variable carbon content by flame spray pyrolysis, wherein a combustible precursor solution A, containing at least two metal alkyloates of which include at least one manganese alkyloate and at least one copper alkyloate, or a combustible precursor solution B, containing a metal alkyloate/metal salt mixture, selected from copper alkyloate and manganese alkyloate,
   said metal salt containing a metal ion Me, with Me selected from metal ions of the subgroups of the periodic system of the elements,
   wherein in precursor solution B, Me (metal alkyloate)≠Me (metal salt), and
   wherein the alkyl chain in the alkyloates of precursor solution A and precursor solution B is used in stoichiometric excess based on a quantity of oxygen in a dispersion gas, and wherein a combustion ratio of Φ from 3.5 bis 0.4 is established.

2. The method according to claim 1, characterized in that each precursor solution contains at least one organic solvent selected from n-hexane, ethanol, 2-ethylhexanoic acid, methanol, acetic acid, n-heptane, xylene, toluene, benzene, trichloromethane, ethylbenzene and mixtures of these.

3. The method according to claim 1, characterized in that a quartz tube is placed over the combustion flame.

4. The method according to claim 1, characterized in that the precursor solution A contains the two metal alkyloates with a molar ratio of 10:90 to 90:10.

5. The method according to claim 1, characterized in that in precursor solution B the molar ratio of the total quantity of the metal alkyloates to the total quantity of metal salt is 80:20 to 99:1.

6. Hydrophobized hopcalite nanoparticles, containing carbon at a content of 0.1 to 5 wt.-%, based on the total quantity of nanoparticles, and a hydrophobicity index of 0.2 to 1.

7. Hydrophobized hopcalite nanoparticles according to claim 6, characterized in that the nanoparticles have a specific surface of 10 to 250 $m^2/g$.

8. A method of oxidation of carbon monoxide and/or formaldehyde, said method comprising: providing the hydrophobized hopcalite nanoparticles according to claim 7 and using said hydrophobized hopcalite nanoparticles for the oxidation of carbon monoxide and/or formaldehyde.

9. A method of oxidation of carbon monoxide and/or formaldehyde, said method comprising: providing the hydrophobized hopcalite nanoparticles according to claim 7 in respirator masks.

\* \* \* \* \*